(No Model.)

A. W. WHEATON.
SPRING CLAMP FOR CHILDREN'S TRAYS.

No. 469,798. Patented Mar. 1, 1892.

Attest:
L. Lee.
J. Van Nest Jr.

Inventor.
A. W. Wheaton, per
Crane & Miller, Attys.

UNITED STATES PATENT OFFICE.

ABRAM W. WHEATON, OF NEWARK, NEW JERSEY.

SPRING-CLAMP FOR CHILDREN'S TRAYS.

SPECIFICATION forming part of Letters Patent No. 469,798, dated March 1, 1892.

Application filed September 28, 1891. Serial No. 407,076. (No model.)

*To all whom it may concern:*

Be it known that I, ABRAM W. WHEATON, a citizen of the United States, residing at Newark, Essex county, New Jersey, have invented certain new and useful Improvements in Spring-Clamps for Children's Trays, fully described and represented in the following specification and the accompanying drawings, forming a part of the same.

This invention relates to a spring and socket of particular construction for application to the under side of a child's tray. The spring is formed of a flat leaf adapted to clamp the tray upon the table and having attached to its base a wire spring bent in such form that the flat leaf bears upon the wire at a gradually-increasing distance from the bases as the flat spring is strained outward in its application to the table-leaf. A socket is used in connection with the spring, adapted to fit the flat leaf and the wire where they are joined together and having feet for attachment to the tray.

Figure 1:
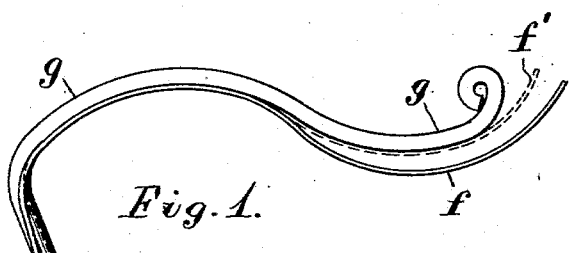
Figure 2:
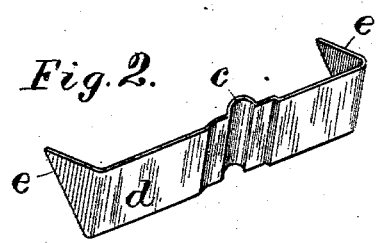
Figure 3:
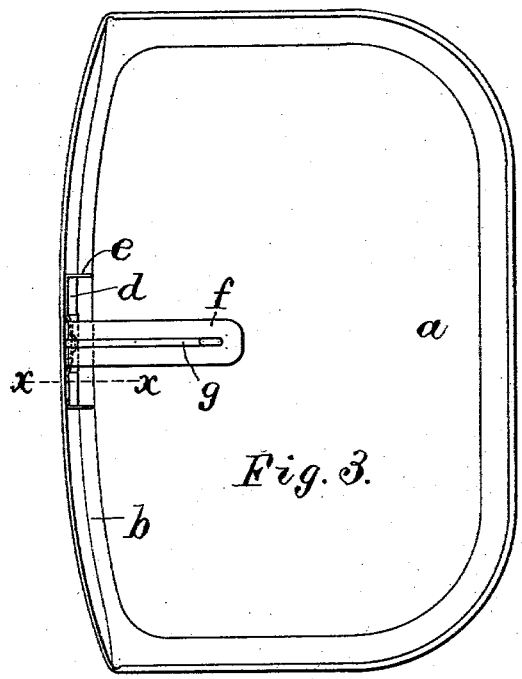

Figure 1 is an edge view of the compound spring. Fig. 2 is a perspective view of the compound socket and brace for the edge of the tray. Fig. 3 shows the under side of a tray with the spring applied at the edge, and Fig. 4 is a section of the same through the center of the spring.

Figure 4:
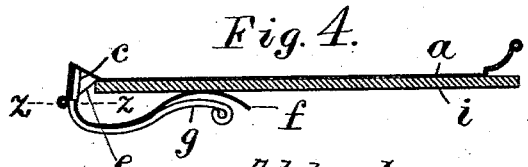

In Figs. 3 and 4, *a* is the body of the tray, having a molding.

Figure 5:
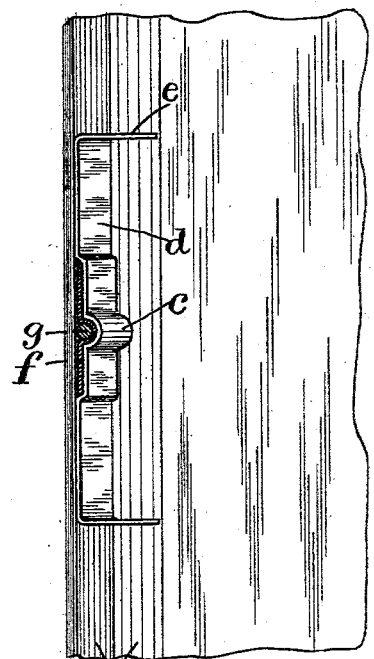

Fig. 5 is a sectional plan view of the two springs at their points of connection, the section of the springs being taken on line *z z* in Fig. 4, and the plan including the adjacent parts of the tray with the socket and brace secured to its edge.

In Figs. 5 and 6, *a* is the body of the tray, having a molding *b* projected from its upper surface at one edge to retain the crumbs thereon. *c* is a socket formed integral with a foot-piece *d* and braces *e* and secured within the under side of the molding *b* by soldering to the same. The molding is shown of angular form, and the braces are fitted transversely within the molding, so as to secure the outer and inner edges of the molding together, and thus prevent the edge of the tray from bending when the spring is fitted in the socket and applied to the table. The spring is formed of a flat leaf *f*, having one end fitted in the socket *c* parallel with the outer side of the molding *b*, and the remainder of the leaf bent over into a curve, so as to lie adjacent to the under side of the tray, with its end bent outward from the same to slip readily upon the edge of a table. The spring is bent close enough to the bottom of the tray to grasp the thinnest table-leaf for which it is intended, as shown in Fig. 4. The reinforcing-spring *g* is shown as a piece of wire secured to the base of the spring *f* and extended outside the back of the spring a portion of its length, so as to permit the flexure of the flat spring through a limited space without resistance from the wire. The two springs are secured together by solder at their base and the flat spring is formed with a groove in the middle of its base to admit the end of the wire *g*. Such conformation is indicated by the crossing of the lines which represent the wire and by the lines which represent the flat spring at the base of the latter in Fig. 1 and is clearly shown in Fig. 3, where the groove in the flat spring is indicated by dotted lines and the wire *g* sunk in such groove, so as to make the side of the composite spring flush to lie in close contact with the outer side of the molding *b*. By such construction the socket which is shown in Fig. 2 is formed with feet which fit flatly against the molding, and is provided with a shallow recess to fit the flat spring and a groove in the middle of such shallow recess to receive the bent portion of such flat spring and the wire inclosed therein. If the flat spring were not grooved at its base, the socket could not be made to fit the same; but the molding of the tray would require to be grooved to accommodate the wire where it lay upon the outer side of the flat spring at its base. The necessity of thus grooving the molding is obviated by grooving the flat spring, and thus adapts the spring and socket for sale independent of the trays and for application thereto by manufacturers without any alteration in the tray. It is obvious that if the flat leaf be applied to a table of sufficient thickness it will be pressed away from the bottom of the tray into contact with the reinforcing-spring at a gradually-increasing distance from the base where the springs are united, the leaf-spring finally bearing close to the outer end of the wire, as indicated by the dotted lines *f'* in Fig.

1, which then supports the leaf-spring a considerable distance from its socket, and thus shortens its leverage and increases its strength in the highest degree.

It has been found by experience that the flat spring is not adapted to hold the tray if bent in a great degree, and the reinforcing-spring therefore serves to strengthen and support such flat spring under such flexures. The socket $c$ is formed to snugly hold the wire $g$, as well as the flat plate $f$, as shown in Fig. 5, and the reinforcing-spring does not, therefore, depend upon the foot of the leaf-spring for its own resistance. It is obvious that the pressure upon the spring tends to bend the molded edge of the tray, and that the braces $e$ are very desirable to prevent such bending and to give the spring a rigid fulcrum. By forming the braces in a single piece with the foot $d$ of the spring $e$ the attachment is made very cheaply by stamping in a single operation and is then soldered to the tray. The braces are readily shaped to fit a molding of any section.

I am aware that drying-room clips have been made of a yielding spring formed with an abrupt bend and a rigid brace or clip fixed in contact with the bend to sustain the spring; but in such case the clip is not a yielding element, like the wire $g$ in my construction, nor is the spring pressed gradually into contact therewith when bent outward so as to be stiffened in a gradually-increasing ratio as it is strained. I hereby disclaim a rigid stiffener applied to a spring, as my invention involves the use of two flexible elements, one of which is brought gradually into contact with the other as it is strained.

The compound spring shown herein, as well as the socket having the brace $e$ attached thereto, may be made separately and sold apart from the tray for application thereto, and such attachments are therefore claimed herein as new articles of manufacture. The compound spring is made so that the leaf-spring is normally in contact with the reinforcing-spring near the base only, and is pressed into contact therewith gradually when bent outward by application to the table, its outer end being stiffened by receiving the support of the reinforcing-spring nearer to the end the more it is bent.

Having thus set forth the nature of my invention, what I claim herein is—

1. As a new article of manufacture, the spring for children's trays, consisting in the flat leaf $f$ and the wire $g$, secured together at the base and bent in the manner described and provided with a socket $c$, adapted to fit the leaf and the wire and having feet $d$ for securing the socket upon a child's tray, substantially as herein set forth.

2. The combination, with a child's tray and a suitable socket secured thereon, of the flat spring $f$, having a groove at its base, and the spring $g$, secured within such groove, the spring being bent, substantially as herein set forth.

3. The combination, with a child's tray, of the spring consisting in the flat leaf $f$ and a wire $g$, secured together at the base and bent, substantially as described, and the socket $c$, adapted to receive the bases of the leaf and the wire and secured upon the tray, as herein set forth.

4. The combination, with a child's tray, of the spring consisting in the flat leaf $f$ and a wire $g$, secured together at the base and bent, substantially as described, and the socket $c$, adapted to receive the base of the leaf and the wire and provided with the feet $d$ and braces $e$ and secured within a molding within the edge of the tray, as and for the purpose set forth.

In testimony whereof I have hereunto set my hand in the presence of two subscribing witnesses.

ABRAM W. WHEATON.

Witnesses:
L. LEE,
THOS. S. CRANE.